(12) United States Patent
Loccufier et al.

(10) Patent No.: US 12,421,406 B2
(45) Date of Patent: Sep. 23, 2025

(54) FLUID SET FOR INKJET PRINTING

(71) Applicant: AGFA NV, Mortsel (BE)

(72) Inventors: Johan Loccufier, Mortsel (BE); Jos Louwet, Mortsel (BE)

(73) Assignee: Agfa NV, Mortsel (BE)

( * ) Notice: Subject to any disclaimer, the term of this patent is extended or adjusted under 35 U.S.C. 154(b) by 513 days.

(21) Appl. No.: 17/922,625

(22) PCT Filed: Apr. 26, 2021

(86) PCT No.: PCT/EP2021/060814
§ 371 (c)(1),
(2) Date: Nov. 1, 2022

(87) PCT Pub. No.: WO2021/224046
PCT Pub. Date: Nov. 11, 2021

(65) Prior Publication Data
US 2023/0167319 A1    Jun. 1, 2023

(30) Foreign Application Priority Data
May 5, 2020   (EP) ..................... 20172945

(51) Int. Cl.
| | |
|---|---|
| *C09D 11/322* | (2014.01) |
| *C09D 11/102* | (2014.01) |
| *C09D 11/40* | (2014.01) |
| *C09D 11/54* | (2014.01) |
| *C09D 139/02* | (2006.01) |

(52) U.S. Cl.
CPC .......... *C09D 11/322* (2013.01); *C09D 11/102* (2013.01); *C09D 11/40* (2013.01); *C09D 11/54* (2013.01); *C09D 139/02* (2013.01)

(58) Field of Classification Search
CPC ..... C09D 11/322; C09D 11/102; C09D 11/54; C09D 11/40; C09D 139/02
USPC ........................................................ 523/201
See application file for complete search history.

(56) References Cited

U.S. PATENT DOCUMENTS

| | | | |
|---|---|---|---|
| 6,037,390 A | 3/2000 | Page et al. | |
| 2005/0239920 A1 | 10/2005 | Ono et al. | |
| 2010/0298494 A1* | 11/2010 | Nakamura | C09D 11/101 |
| | | | 524/854 |
| 2019/0249024 A1 | 8/2019 | Shinohara et al. | |
| 2019/0367760 A1* | 12/2019 | Loccufier | B41M 5/0047 |

FOREIGN PATENT DOCUMENTS

| | | | | |
|---|---|---|---|---|
| EP | 0293337 A2 | 11/1988 | | |
| EP | 0927786 A2 | 7/1999 | | |
| EP | 1125760 A1 | 8/2001 | | |
| EP | 2626390 A2 | 8/2013 | | |
| EP | 3081607 A1 * | 10/2016 | ............. | B01J 13/16 |
| JP | 2003-295420 A | 10/2003 | | |
| JP | 2007-001112 A | 1/2007 | | |
| JP | 2020-509148 | 3/2020 | | |
| WO | WO 2001/008895 A1 | 2/2001 | | |
| WO | WO 2004/003074 A1 | 1/2004 | | |
| WO | WO 2015/158654 A1 | 10/2015 | | |
| WO | WO 2018/051460 A1 | 3/2018 | | |
| WO | WO 2018/077624 A1 | 5/2018 | | |
| WO | WO 2018/138054 A1 | 8/2018 | | |
| WO | WO-2018137993 A1 * | 8/2018 | ............. | B01J 13/14 |

OTHER PUBLICATIONS

European Patent Office, International Search Report in International Patent Application No. PCT/EP2021/060814, mailed Jul. 16, 2021, 4 pp.
European Patent Office, Written Opinion in International Patent Application No. PCT/EP2021/060814, mailed Jul. 16, 2021, 6 pp.
U.S. Appl. No. 17/922,628, filed Nov. 1, 2022.
U.S. Appl. No. 17/922,818, filed Nov. 2, 2022.
U.S. Appl. No. 17/922,820, filed Nov. 2, 2022.
U.S. Appl. No. 17/923,024, filed Nov. 3, 2022.

* cited by examiner

*Primary Examiner* — Deve V Hall
(74) *Attorney, Agent, or Firm* — Leydig, Voit & Mayer, Ltd.

(57) ABSTRACT

A fluid set for inkjet printing comprising a fluid comprising a compound functionalized with at least two functional groups being of a primary amine or a secondary amine, and an aqueous inkjet ink comprising a colorant and a polymeric particle comprising an oligomer or polymer having at least 3 repeating units comprising a functional group according to general formula I, II or III. The fluid is preferably a pre-treatment liquid or over coat liquid.

20 Claims, No Drawings

FLUID SET FOR INKJET PRINTING

CROSS-REFERENCE TO RELATED APPLICATIONS

This patent application is the U.S. national phase of copending International Patent Application No. PCT/EP2021/060814, filed Apr. 26, 2021, which claims the benefit of European Patent Application No. 20172945.6, filed May 5, 2020.

TECHNICAL FIELD

The present invention relates to a fluid set comprising a resin based aqueous inkjet ink.

BACKGROUND ART

The industrial applications of ink jet are expanding into more and more fields of technology, having to meet ever more demanding physical properties. Industrial printing technology has to be compatible with a broad scope of non-absorbing substrates such as glass and metals but also synthetic resins, including temperature sensitive resins such as polyolefines.

Chemical resistance against aggressive solvents is one of the demands images have to fulfil in heavy duty applications. Until now, ink jet technology in heavy duty applications has been UV based. However, aqueous technology is gradually gaining ground also in the more demanding applications.

In order to meet the demands in industrial ink jet applications, aqueous resin based inks have been designed, based on different technologies. Latex based technologies, as disclosed in WO2018077624A, are compatible with temperature sensitive substrates based on tuning the film forming temperature of the latex. However, their adhesion performance is not always optimal and especially their chemical resistance is limited. Moreover, latex based inks show the tendency of film formation at the nozzle of the inkjet head, leading to inkjet reliability problems.

Encapsulation based technologies as disclosed in WO2015158654A and EP293337A, avoid film formation at the nozzle of the inkjet head, but often require a high activation temperature, making the technology not suited for printing on temperature sensitive substrates such as polyolefines. In order to tackle the problem of chemical resistance in combination with compatibility with temperature sensitive substrates, several approaches based on water based UV technologies have been disclosed. These approaches require both drying and curing, making printer design complex.

In US20190249024, a dual ink approach is disclosed wherein a first ink comprises an epoxy compound and a second ink comprises a primary amine based polymer. The combination is claimed to result in good adhesion properties and alcohol resistance. However, it is known that epoxy compounds are prone to hydrolysis, holding the risk of losing activity upon storage of the aqueous based ink.

EP1125760A discloses a recording method wherein an aqueous inkjet ink comprising resin particles having β-diketone groups is printed with a reactant liquid to achieve excellent rubbing and scratching resistance of the printed images. Resins having β-diketone groups are prone to at least partial hydrolysis when stored for a long time. Due to this at least partial hydrolysis, reactivity and hence obtainable improvement with respect to rubbing and scratching resistance will decrease upon storage of the inkjet inks.

Therefore, there is still a need for aqueous resin based technologies, showing reliable ink jetting behaviour, compatible with temperature sensitive substrates, yielding excellent physical properties such as chemical resistance upon drying and not holding the risk of hydrolysis upon storage.

SUMMARY OF INVENTION

It is the objective of the present invention to provide a solution to the above stated problems. The objective has been achieved by providing a fluid set as defined in claim 1.

It is another embodiment of the invention to provide a printing method using the fluid set of claim 1 as defined in claim 12.

Other features, elements, steps, characteristics and advantages of the present invention will become more apparent from the following detailed description of preferred embodiments of the present invention. Specific embodiments of the invention are also defined in the dependent claims.

DESCRIPTION OF EMBODIMENTS

A. Fluid Set According to the Invention

The fluid set according to the invention comprises:
a) a fluid comprising a compound functionalized with at least two functional groups selected from the group consisting of a primary amine and a secondary amine.
b) an aqueous inkjet ink comprising a colorant and a polymeric particle comprising an oligomer or polymer having at least 3 repeating units comprising a functional group according to general formula I, II or III (see below).

The fluid can be 1) a primer or pre-treatment liquid, which is applied before the jetting of the aqueous inkjet ink of the fluid set; 2) an overcoat, which is applied after the jetting of the aqueous inkjet ink of the fluid set; 3) an inkjet ink which is jetted together with the aqueous inkjet ink of the fluid set and comprising a colorant and a polymeric particle comprising an oligomer or polymer having at least 3 repeating units comprising a functional group according to general formula I, II or III (see below).

A.1. Aqueous Inkjet Ink According to the Invention
A.1.1. Polymeric Particle

The aqueous inkjet ink of the fluid set according to the invention, comprises a colorant and a polymeric particle, the polymeric particle comprises an oligomer or polymer having at least 3 repeating units comprising a functional group according to general formula I, II or III

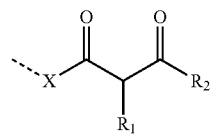

general formula I

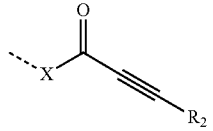

general formula II

-continued

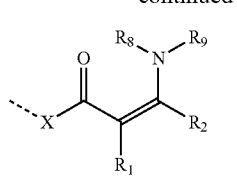

general formula III wherein
$R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$ and CN $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group and $COR_3$ $R_1$ and $R_2$ may represent the necessary atoms to form a five to eight membered ring $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$ and $NR_5R_6$ $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_5$ and $R_6$ may represent the necessary atoms to form a five to eight membered ring X is selected from the group consisting of O and $NR_7$ $R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group.

$R_8$ and $R_9$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group $R_8$ and $R_9$ may represent the necessary atoms to form a five to eight membered ring.

In a preferred embodiment said oligomer or polymer comprising repeating units functionalized with a moiety according to general formula I, comprise at least 7 functionalized, more preferably at least 10 and most preferably at least 15 functionalized repeating units.

The oligomer or polymer according to the present invention preferably has a weight average molecular weight of at least 2000, more preferably 4000 and most preferably between 6000 and 30000.

The polymer according to the present invention can be a homopolymer or a copolymer of different repeating units.

Oligomers or polymers according to the present invention can be prepared by addition polymerization of ethylenically unsatured monomers, polycondensation and ring opening polymerization, addition polymerization being particularly preferred. In the most preferred embodiment, free radical polymerization of ethylenically unsaturated monomers is used to prepare the resins according to the present invention. In another embodiment of the present invention, the molecular weight of the resins according to the present invention is controlled using RAFT agents, ATRP, nitroxyl radical technology or transfer agents, preferably thiols.

In a further preferred embodiment, X represents an oxygen. In an even further preferred embodiment, $R_1$ represents a hydrogen. In an even further preferred embodiment $R_2$ represent a substituted or unsubstituted alkyl group, unsubstituted being more preferred, a lower alkyl group being even more preferred and a methyl group being the most preferred.

Typical monomers for the preparation of resins according to the present invention are given below without being limited thereto.

Monomers for addition polymerization: See Table 1

TABLE 1

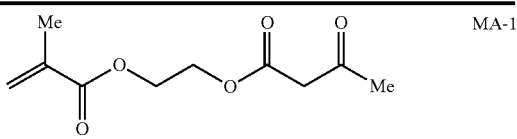

MA-1

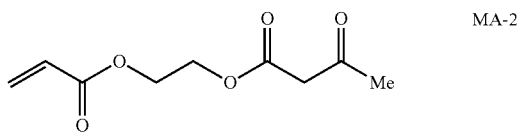

MA-2

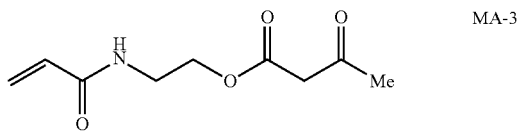

MA-3

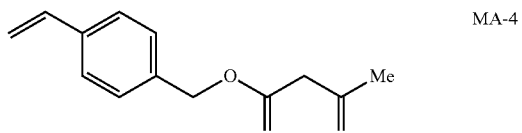

MA-4

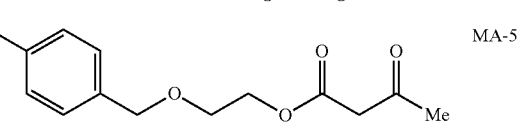

MA-5

TABLE 1-continued

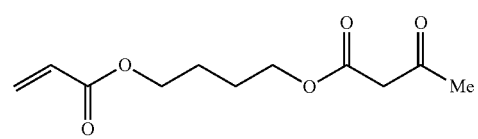 [SMILES: C=CC(=O)OCCCCOC(=O)CC(C)=O]
MA-6

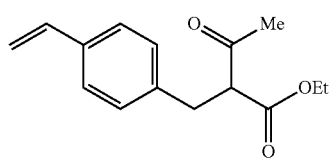 [SMILES: C=Cc1ccc(CC(C(C)=O)C(=O)OCC)cc1]
MA-7

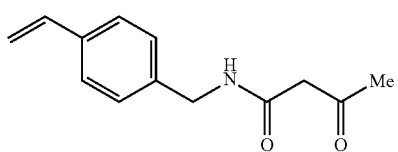 [SMILES: C=Cc1ccc(CNC(=O)CC(C)=O)cc1]
MA-8

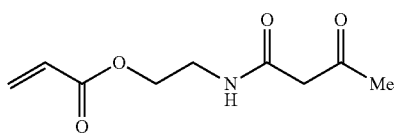
MA-9

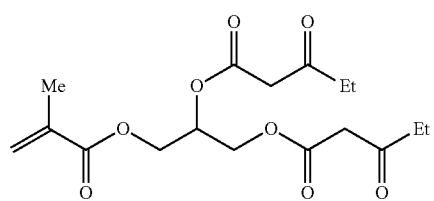 [SMILES: C=C(C)C(=O)OCC(COC(=O)CC(=O)CC)OC(=O)CC(=O)CC]
MA-10

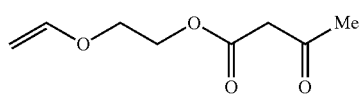
MA-11

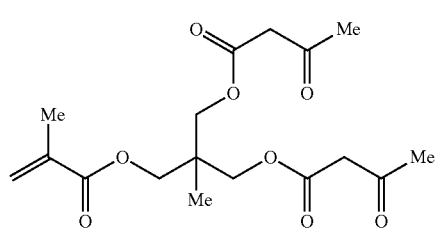 [SMILES: C=C(C)C(=O)OCC(C)(COC(=O)CC(C)=O)COC(=O)CC(C)=O]
MA-12

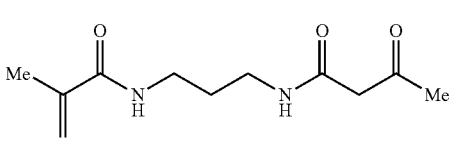 [SMILES: C=C(C)C(=O)NCCCNC(=O)CC(C)=O]
MA-13

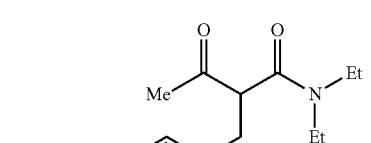
MA-14

TABLE 1-continued

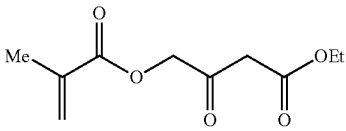
MA-15

Free radical and cationic polymerization conditions are preferred to prepare addition polymers according to the present invention.

Monomers for Ring Opening Polymerization: See Table 2

TABLE 2

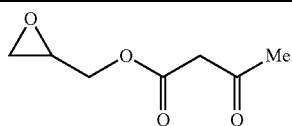
MR-1

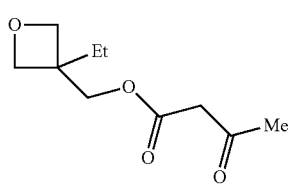 [SMILES: CCC1(COC(=O)CC(C)=O)COC1]
MR-2

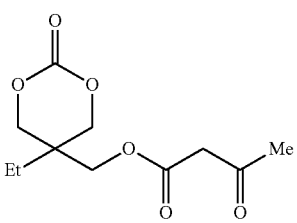 [SMILES: CCC1(COC(=O)CC(C)=O)COC(=O)OC1]
MR-3

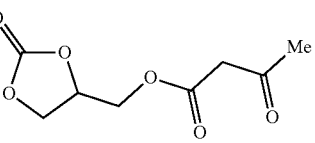
MR-4

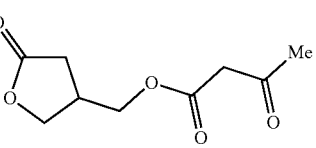
MR-5

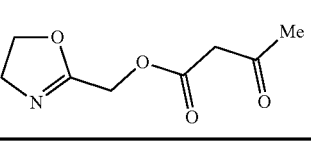
MR-6

Poly(ethers), poly(esters), poly(carbonates) and poly(amides) or copolymers thereof can be prepared using ring opening polymerization circumstances documented in the scientific literature.

Monomers for Polycondensation: See Table 3

TABLE 3

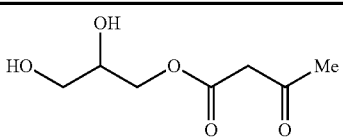
MP-1

TABLE 3-continued

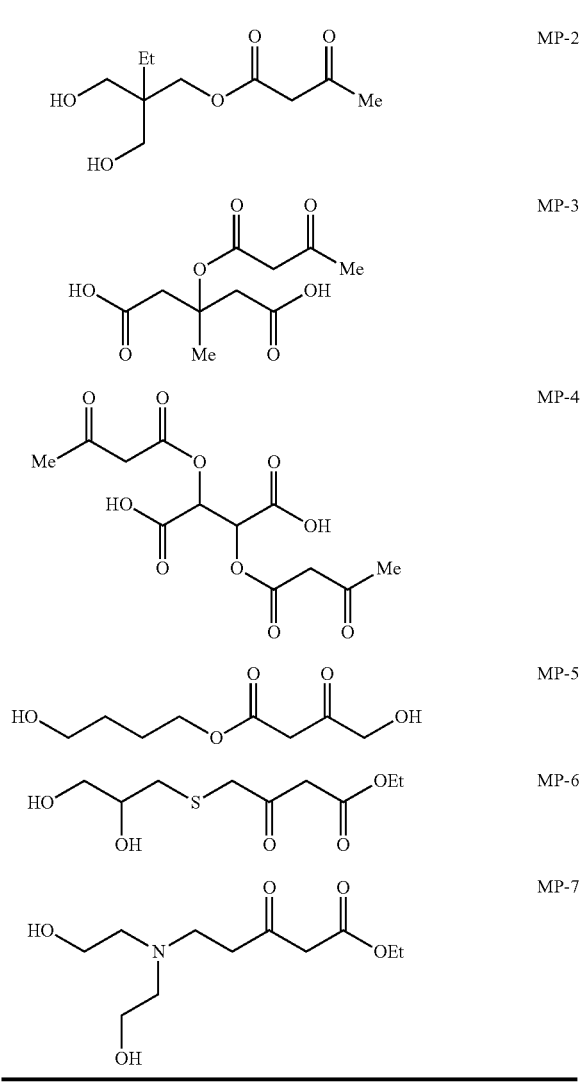

Poly(esters) can be prepared by condensation of functionalized diols with di-acids or di-acid chlorides under conditions known to those skilled in the art. Functionalized di-acids can be converted into poly(esters) by condensation with diol. Poly(urethanes) can be prepared by condensation of functionalized diols with di-isocyanates under conditions known to those skilled in the art.

The particles comprising an oligomer or polymer having at least 3 repeating units comprising a functional group according to general formula I, II or III, are preferably dispersed in the aqueous vehicle of the inkjet ink. The particles are dispersed in the aqueous medium of the inkjet ink preferably by using dispersants or surfactants.

The particles preferably have an average particle size of no more than 4 µm as determined by dynamic laser diffraction. The nozzle diameter of inkjet print heads is usually 20 to 35 µm. Hence preferably, the average particle size is from 0.05 to 2 µm, more preferably from 0.10 to 1 µm. When the average particle size of the particle is smaller than 2 µm, excellent resolution and dispersion stability with time are obtained.

The particles are preferably present in an aqueous inkjet ink, but can also be present in a primer or overcoat. The amount of particles in the inkjet ink is of no more than 45 wt. %, preferably between 5 and 25 wt. % based on the total weight of the ink. It was observed that above 30 wt. % jetting was not always so reliable.

In a preferred embodiment, the oligomer or polymer according to the present invention is encapsulated to form an aqueous dispersion, preferably by polymerization, more preferably by using interfacial polymerization. Encapsulation increases the storage stability of the aqueous inkjet due to the formation of a polymeric barrier, i.e. the polymeric shell of the capsule, between the oligomer or polymer and the other compounds in the aqueous inkjet ink. More particularly, partial hydrolysis of the functional group according to general formula I upon storage of the aqueous inkjet ink is prevented. The reactivity and hence the obtained improvements towards solvent and water resistance of the printed images does hence not decrease upon storage of the inkjet ink.

It has also been observed that the encapsulation of the oligomer or polymer having at least 3 repeating units comprising the functional group according to general formula I, II or III results in a more reliable jetting behaviour of the inkjet ink comprising the resin than without encapsulation.

The capsules preferably have an average particle size of no more than 4 µm as determined by dynamic laser diffraction for the same reason explained above.

The capsules are dispersed in the aqueous medium of the inkjet ink preferably using a dispersing group covalently bonded to the polymeric shell or are dispersed by using dispersants or surfactants preferably added during or after the formation of the capsule. The dispersing group covalently bonded to the polymeric shell is preferably selected from the group consisting of a carboxylic acid or salt thereof, a sulfonic acid or salt thereof, a phosphoric acid ester or salt thereof, a phosphonic acid or salt thereof.

The dispersing group can be used in combination with a polymeric dispersant in order to accomplish steric stabilization. For example, the polymeric shell may have covalently bonded carboxylic acid groups that interact with amine groups of a polymeric dispersant. However, in a more preferred embodiment, no polymeric dispersant is used and dispersion stability of the inkjet ink is accomplished solely by electrostatic stabilization. For example, a slightly alkaline aqueous medium will turn the carboxylic acid groups covalently bonded polymeric shell into ionic groups, whereafter the negatively charged capsules have no tendency to agglomerate. If sufficient dispersing groups are covalently bonded to the polymeric shell, the capsule becomes a so-called self-dispersing capsule.

These negatively charged capsule surfaces can also be advantageously used during inkjet printing. For example, a second liquid such as a pre-treatment liquid containing a cationic substance, being a cationic polymer or multivalent salt, can be used to precipitate the anionic capsules in the inkjet ink printed on top of the second liquid. By using this method an improvement in image quality can be observed due to the immobilisation of the capsules.

There is no real limitation on the type of polymer used for the polymeric shell of the capsule. Preferably, the polymer used in the polymeric shell is preferably cross-linked. By crosslinking, more rigidity is built into the capsules allowing a broader range of temperatures and pressures for handling the capsules in both the ink making and in the inkjet printer.

Preferred examples of the polymeric shell material include polyureas, polyesters, polycarbonates, polyamides, melamine based polymers and mixtures thereof, with polyureas being especially preferred.

A.1.2. Preparation of the Polymeric Particle According to the Invention

The encapsulated oligomer or polymer, having at least 3 repeating units comprising a functional group according to general formula I, II or III surrounded with a polymeric shell, can be prepared using both chemical and physical methods. Suitable encapsulation methodologies include complex co-acervation, liposome formation, spray drying and polymerization methods.

In the present invention preferably a polymerization method is used, as it allows the highest control in designing the capsules. More preferably interfacial polymerization is used to prepare the capsules of the invention. This technique is well-known and has been reviewed by Zhang Y. and Rochefort D. (Journal of Microencapsulation, 29(7), 636-649 (2012) and by Salitin (in Encapsulation Nanotechnologies, Vikas Mittal (ed.), chapter 5, 137-173 (Scrivener Publishing LLC (2013)).

In interfacial polymerization, such as interfacial polycondensation, two reactants meet at the interface of the emulsion droplets and react rapidly.

In general, interfacial polymerisation requires the dispersion of an oleophilic phase in an aqueous continuous phase or vice versa. Each of the phases contains at least one dissolved monomer (a first shell component) that is capable of reacting with another monomer (a second shell component) dissolved in the other phase. Upon polymerisation, a polymer is formed that is insoluble in both the aqueous and the oleophilic phase. As a result, the formed polymer has a tendency to precipitate at the interface of the oleophilic and aqueous phase, hereby forming a shell around the dispersed phase, which grows upon further polymerisation. The capsules according to the present invention are preferably prepared from an oleophilic dispersion in an aqueous continuous phase.

Typical polymeric shells of the capsules according to the invention and formed by interfacial polymerisation are selected from the group consisting of polyamides, typically prepared from di- or poly-acid chlorides as first shell component and di- or oligoamines as second shell component, polyurea, typically prepared from di- or oligoisocyanates as first shell component and di- or oligoamines as second shell component, polyurethanes, typically prepared from di- or oligoisocyanates as first shell component and di- or oligoalcohols as second shell component, polysulfonamides, typically prepared from di- or oligosulfochlorides as first shell component and di- or oligoamines as second shell component, polyesters, typically prepared from di- or oligo-acid chlorides as first shell component and di- or oligoalcohols as second shell component and polycarbonates, typically prepared from di- or oligo-chloroformates as first shell component and di- or oligoalcohols as second shell component. The shell can be composed of combinations of these polymers.

In a further embodiment, polymers, such as gelatine, chitosan, albumin and polyethylene imine can be used as second shell components in combination with a di- or oligio-isocyanate, a di- or oligo acid chloride, a di- or oligo-chloroformate and an epoxy resin as first shell component.

In a particularly preferred embodiment, the shell is composed of a polyurea or a combination thereof with a polyurethane. In a further preferred embodiment, a water immiscible solvent is used in the dispersion step, which is removed by solvent stripping before or after the shell formation. In a particularly preferred embodiment, the water immiscible solvent has a boiling point below 100° C. at normal pressure. Esters are particularly preferred as water immiscible solvent.

A water immiscible solvent is an organic solvent having low miscibility in water. Low miscibility is defined as any water solvent combination forming a two phase system at 20° C. when mixed in a one over one volume ratio.

The core contains the oligomer or polymer having at least 3 repeating units comprising a functional group according to general formula I, II or III. These are usually incorporated into the capsules by dissolving it in the organic solvent having low miscibility with water and having a lower boiling point than water. A preferred organic solvent is ethyl acetate, because it also has a low flammability hazard compared to other organic solvents.

However, in some cases the organic solvent may be omitted. For example, the organic solvent can be omitted when the oligomer or polymer, having at least 3 repeating units comprising a functional group according to general formula I, II or III have a viscosity of less than 100 mPa·s.

The method for preparing a dispersion of capsules preferably includes the following steps:

a) preparing a non-aqueous solution of a first shell component for forming the polymeric shell and the oligomer or polymer, having at least 3 repeating units comprising a functional group according to general formula I, II or III in an organic solvent having a low miscibility with water and having a lower boiling point than water;

b) preparing an aqueous solution of a second shell component for forming the polymeric shell;

c) dispersing the non-aqueous solution under high shear in the aqueous solution;

d) optionally stripping the organic solvent from the mixture of the aqueous solution and the non-aqueous solution; and e) preparing a polymeric shell around the oligomer or polymer, having at least 3 repeating units comprising a functional group according to general formula I, II or III by interfacial polymerization of the first and second shell component for forming the polymeric shell.

The capsule dispersion can then be completed into the aqueous inkjet ink, by addition of e.g. colorants, water, humectants, surfactant and the like.

In a preferred embodiment, the capsules are self-dispersing capsules. In order to make capsules self-dispersing, anionic dispersing groups, such as carboxylic acids or salts thereof, sulfonic acids or salts thereof, phosphoric acid esters or a salts thereof or a phosphonic acids or salts thereof, are coupled to the polymeric shell of the capsule to guarantee the dispersion stability.

A preferred strategy to incorporate anionic stabilizing groups into the polymeric shell of a capsule makes use of carboxylic acid functionalized reactive surfactants that are capable of reacting with isocyanates. This leads to an amphoteric type of surfactant containing at least partially secondary or primary amines. Other reactive surfactants functionalized with a sulfonic acid or salt thereof, a phosphoric acid ester or a salt thereof or a phosphonic acid or salt thereof can be used.

Several amphoteric surfactants, being mixtures of surfactants partially having secondary amines but also comprising tertiary amines are commercially available. Prohibitive foam formation in ink jet inks based on capsules made by using the commercially available amphoteric surfactants was encountered in an inkjet printer. Foaming caused problems in the ink supply and also in the degassing for trying to remove air from the ink, thus leading to unreliable jetting. Therefore, surfactants according to Formula (I) of WO2016/165970 are preferably used during the encapsulation process of the oligomer or polymer, having at least 3 repeating units comprising a functional group according to general formula I, II or III.

The capsules according to the invention are dispersed into an aqueous medium. The aqueous medium consists of water, but may preferably include one or more water-soluble organic solvents.

The one or more organic solvents may be added for a variety of reasons.

For example, it can be advantageous to add a small amount of an organic solvent to improve the dissolution of a compound in the inkjet ink to be prepared, to obtain better penetration in porous substrates or to prevent fast drying of ink at the nozzle of the inkjet head. Preferable water-soluble organic solvents are polyols (e.g., ethylene glycol, glycerin, 2-ethyl-2-(hydroxymethyl)-1,3-propanediol, tetraethylene glycol, triethylene glycol, tripropylene glycol, 1,2,4-butanetriol, diethylene glycol, propylene glycol, dipropylene glycol, butyleneglycol, 1,6-hexanediol, 1,2-hexanediol, 1,5-pentanediol, 1,2-pentanediol, 2,2-dimethyl-1,3-prapanediol, 2-methyl-2,4-pentanediol, 3-methyl-1,5-pentanediol, 3-methyl-1,3-butanediol, and 2-methyl-1,3-propanediol), amines (e.g., ethanolamine, and 2-(dimethylamino)ethanol), monohydric alcohols (e.g., methanol, ethanol, and butanol), alkyl ethers of polyhydric alcohols (e.g., diethylene glycol monomethyl ether, diethylene glycol monobutyl ether, triethylene glycol monomethyl ether, triethylene glycol monobutyl ether, ethylene glycol monomethyl ether, ethylene glycol monobutyl ether, propylene glycol monomethyl ether, propylene glycol monobutyl ether, and dipropylene glycol monomethyl ether), 2,2'thiodiethanol, amides (e.g., N,N-dimethylformamide), heterocycles (e.g., 2-pyrrolidone and N-methyl pyrrolidone), and acetonitrile.

A.1.3. Colorants

The colorants in the aqueous inkjet ink according to the invention can be dyes such as dispersed dyes, acid dyes, reactive dyes and can be pigments, or a combination thereof. Preferably, the colorant in the inkjet ink according to the invention is a pigment. Pigmented inks deliver images with an extended stability against light fading and improved water and solvent resistance.

The pigments of the ink may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548.

The pigment particles are dispersed in an aqueous medium by means of a polymeric dispersant or a surfactant. Self-dispersible pigments may also be used. If combined with the particles or capsules according to the invention and having anionic dispersing groups, anionic surfactants may be preferably used as dispersant for the pigment. The latter prevents interaction of the polymeric dispersant with the dispersing groups of the particles or capsules included in the inkjet ink, since dispersion stability of the pigment is accomplished by the same technique of electrostatic stabilization as employed for the capsules.

A self-dispersible pigment is a pigment having on its surface covalently bonded anionic hydrophilic groups, such as salt-forming groups or the same groups used as dispersing groups for the capsules, that allow the pigment to be dispersed in an aqueous medium without using a surfactant or a resin. Suitable commercially available self-dispersible colour pigments are, for example, the CAB-O-JET™ inkjet colorants from CABOT.

Pigment particles in inkjet inks should be sufficiently small to permit free flow of the ink through the inkjet-printing device, especially at the ejecting nozzles. It is also desirable to use small particles for maximum colour strength and to slow down sedimentation.

The average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. The average particle size of pigment particles is determined with a Brookhaven Instruments Particle Sizer BI90plus based upon the principle of dynamic light scattering. The sample is diluted with water to a pigment concentration of 0.002 wt %. The measurement settings of the BI90plus are: 5 runs at 23° C., angle of 90°, wavelength of 635 nm and graphics=correction function.

Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

Also special colorants may be used, such as fluorescent pigments for special effects in clothing, and metallic pigments for printing a luxury look of silver and gold colours on textiles.

Suitable polymeric dispersants for the pigments are copolymers of two monomers but they may contain three, four, five or even more monomers. The properties of polymeric dispersants depend on both the nature of the monomers and their distribution in the polymer. Copolymeric dispersants preferably have the following polymer compositions:
  statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;
  graft copolymers (graft copolymers consist of a polymeric backbone with polymeric side chains attached to the backbone); and
  mixed forms of these polymers, e.g. blocky gradient copolymers.

Suitable dispersants are DISPERBYK™ dispersants available from BYK CHEMIE, JONCRYL™ dispersants available from JOHNSON POLYMERS and SOLSPERSE™ dispersants available from Lubrisol. A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

The polymeric dispersant has preferably a number average molecular weight $M_n$ between 500 and 30000, more preferably between 1500 and 10000.

The polymeric dispersant has preferably a weight average molecular weight Mw smaller than 100,000, more preferably smaller than 50,000 and most preferably smaller than 30,000.

The pigments are preferably present in the range of 0.01 to 20%, more preferably in the range of 0.05 to 10% by weight and most preferably in the range of 0.1 to 5% by weight, each based on the total weight of the inkjet ink. For white inkjet inks, the white pigment is preferably present in an amount of 3% to 40% by weight of the inkjet ink, and more preferably 5% to 35%. An amount of less than 3% by weight cannot achieve sufficient covering power.

A.1.4. Additives

The aqueous inkjet ink according to the invention contains water, but may include one or more water-soluble organic solvents. Suitable organic solvents are described in § A.1.2.

The aqueous inkjet ink according to the invention may also contain humectants. Humectants prevent the clogging of nozzles. The prevention is due to its ability to slow down the evaporation rate of the inkjet ink, especially the water in the liquid. The humectant is preferably an organic solvent having a higher boiling point than water. Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is glycerol.

The humectant is preferably added to the inkjet ink in an amount of 0.1 to 20 wt. % based on the total weight of the liquid.

The aqueous inkjet ink according to the invention may contain a surfactant. Any known surfactant may be used but preferably a glycol surfactant and/or an acetylene alcohol surfactant. The use of the acetylene glycol surfactant and/or the acetylene alcohol surfactant further reduces bleeding to improve printing quality, and also improves the drying property in printing to allow high-speed printing.

The acetylene glycol surfactant and/or the acetylene alcohol surfactant is preferably one or more selected from 2, 4, 7, 9-tetramethyl-5-decine-4, 7-diol, alkylene oxide adducts of 2,4,7,9-tetramethyl-5-decine-4, 7-diol, 2,4-dimethyl-5-decin-4-ol, and alkylene oxide adducts of 2,4-dimethyl-5-decin-4-ol. These are available, for example, from Air Products (GB) as Olfine (registered trademark) 104 series and E series, such as Olfine E 010, or from Nissin Chemical Industry as Surfynol (registered trademark) 465 and Surfynol 61.

The ink jet ink composition according to the invention may further comprise an extra resin. This resin is often added to the ink jet ink formulation to further achieve a good adhesion of the pigment to the substrate. The resin is a polymer and suitable resins can be acrylic based resins, a urethane-modified polyester resin or a polyethylene wax.

The concentration of the resin in the ink jet ink according to the invention is at least 1 (wt.)% and preferably lower than 30 (wt.)%, more preferably lower than 20 (wt.)%.

In a preferred embodiment, the inkjet ink according to the invention is part of an inkjet ink set, more preferably part of a multi-colour inkjet ink set including a plurality of inkjet inks according to the invention. The inkjet ink set preferably includes at least a cyan inkjet ink, a magenta inkjet ink, a yellow inkjet ink and a black inkjet ink. Such a CMYK-inkjet ink set may also be extended with extra inks such as red, green, blue, violet and/or orange to further enlarge the colour gamut of the image. The inkjet ink set may also be extended by the combination of the full density inkjet inks with light density inkjet inks. The combination of dark and light colour inks and/or black and grey inks improves the image quality by a lowered graininess.

In a preferred embodiment, the inkjet ink set also includes a white inkjet ink. This allows obtaining more brilliant colours, especially on transparent substrates, where the white inkjet ink can be applied either as a primer or on top of the colour inkjet inks when the image is viewed through the transparent substrate.

The viscosity of the inkjet ink according to the invention is preferably smaller than 25 mPa·s at 25° C. and at a shear rate of 90 s-1, more preferably between 2 and 15 mPa·s at 25° C. and at a shear rate of 90 s-1. The surface tension of the inkjet ink according to the invention is preferably in the range of about 18 mN/m to about 70 mN/m at 25° C., more preferably in the range of about 20 mN/m to about 40 mN/m at 25° C.

A.2. Fluid According to the Invention

A.2.1. Compound Functionalized with a Primary or a Secondary Amine

The fluid according to the invention comprises a compound functionalized with at least two functional groups selected from the group consisting of a primary amine and a secondary amine, a primary amine being more preferred. Said compound functionalized with at least two functional groups selected from the group consisting of a primary amine and secondary amine, can be selected from a di- or multifunctional low molecular weight compound and an oligomer or polymer.

In a more preferred embodiment, said amino functionalized compound is a low molecular weight compound having a functionality having a functionality of 2 to 8, more preferably 2 to 5 and most preferably is di- or trifunctional. These compounds being more available into the market.

Typical amine functionalized ink additives are given in Table 4 without being limited thereto.

TABLE 4

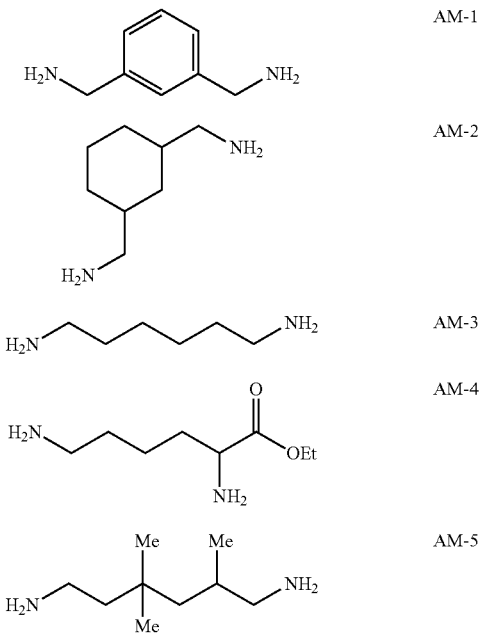

TABLE 4-continued

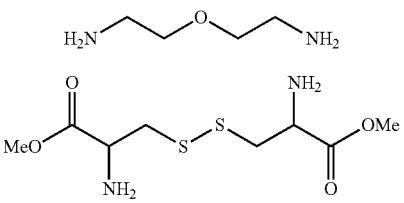 AM-6

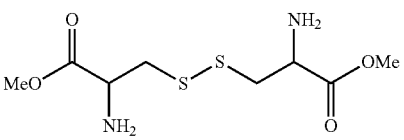 [SMILES: COC(=O)C(N)CSSCC(N)C(=O)OC] AM-7

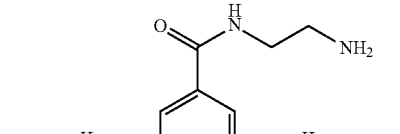 AM-8

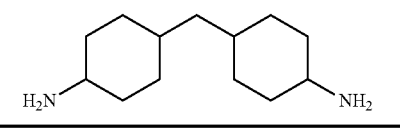 AM-9

In a more preferred embodiment, said compound functionalized with at least two functional groups selected from the group consisting of a primary amine and secondary amine is a polymer is functionalized with at least 5, more preferably at least 10 and most preferably at least 15 functional groups, selected from the group consisting of a primary amine and a secondary amine, a primary amine being more preferred.

The polymer can be dissolved in the fluid or can be present as a dispersed or emulsified polymer particle. Typical polymers, useful in the design of the fluid as a primer, are selected from the group consisting of poly(allylamine), poly(vinylamine), poly(vinylamine-co-vinylformamide), chitosan, homo- or copolymers of 4-aminomethyl-styrene or salt thereof, 2-aminoethyl-acrylate or salt thereof, 2-aminoethyl-methacrylate or salt thereof, 3-aminopropyl-acrylamide or salt thereof, 3-aminopropyl-methacrylamide or salt thereof, poly(lysine) or copolymers thereof and the like.

In a preferred embodiment, the fluid comprises at least one resin particle, functionalized with at least 5, more preferably at least 10 and most preferably at least 15 functional groups selected from the group consisting of a primary amine and a secondary amine, a primary amine being more preferred. The use of a functionalized resin particle instead of a functionalized compound in the fluid has the advantage of an improved rheological behaviour leading to an improved jetting reliability and colloidal stability of the fluid. This is of great importance if the fluid has to be jetted in the image forming method by means of an inkjet head or valve-jet head, for example if the fluid is a primer (pre-treatment liquid), an aqueous inkjet ink or an overcoat which is image wise applied.

The amino functionalized resin particle can be prepared by derivatisation of amino functionalized polymers, followed by dispersing of said derivative in an aqueous environment, optionally followed by crosslinking of the particle. Preferred starting polymers are homo- or co-polymers of vinyl amine or allylamine. Typical examples include poly (allylamine), poly(vinylamine), poly(vinylamine-co-vinylformamide), chitosan, homo- or copolymers of 4-aminomethyl-styrene or salt thereof, 2-aminoethyl-acrylate or salt thereof, 2-aminoethyl-methacrylate or salt thereof, 3-aminopropyl-acrylamide or salt thereof, 3-aminopropyl-methacrylamide or salt thereof, poly(lysine) or copolymers thereof and the like. The weight average molecular weight of the starting polymers is preferably at least 7000, more preferably at least 15000 and most preferably at least 25000.

Other synthetic strategies include derivatisation of carboxylic acid functionalized acrylic polymers with azeridine followed by emulsification and optionally crosslinking, emulsion or mini-emulsion polymerization of optionally protected amino functionalized monomers, optionally followed by deprotection, post derivatisation of reactive latexes, comprising reactive monomers such as 4-chloromethyl-styrene and sol gel based polycondensations based on amino functionalized alkoxysilanes.

In a preferred embodiment, said amino functionalized resin particles are crosslinked. Crosslinked particles give more formulation latitude. Indeed, due to crosslinking, resin particles will be more resistant to water soluble organic solvents present in the vehicle of the ink. In a further preferred embodiment at least 5 mol %, more preferably at least 10 mol % and most preferably at least 20 mol % of the repeating units in the polymer resin particle are functionalized with a functional groups selected from the group consisting of a primary amine and a secondary amine.

The amines can be at least partially neutralized with an acid such as hydrochloric acid, methane sulfonic acid, p.-toluene sulfonic acid, phosphoric acid, sulfuric acid and carboxylic acids such as acetic acid, citric acid and lactic acid.

A.2.2. Additives

The fluid may comprise additives which are specific for the functioning of the fluid.

A.2.2.1. Additives for the Fluid Acting as Primer

If the fluid as part of the fluid set according to the invention functions as a primer, the fluid may further comprise a component capable of aggregating components in the aqueous inkjet ink of the ink set. Examples are a flocculating agent which reacts with the colorant of the aqueous ink of the fluid set. The flocculating agent induces a viscosity increase, a precipitation or an immobilization of the colorant of the ink when the aqueous ink comes into contact with the fluid acting as primer.

The flocculating agent is preferably a resin, a cationic surfactant or a multivalent metal ion. Suitable examples of multivalent metal ions are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating the colorant, more specifically the pigment, by acting on the carboxyl groups on the surface of the pigment in the ink jet ink, or on the dispersed polymer of capsules contained in the ink. As a result, the colorants of the ink are fixed resulting in a decreased color bleeding and beading. Therefore, it is preferred that the surface of the pigment in the ink and/or the dispersed polymer of the capsules, if contained in the ink, have an anionic group, preferably a carboxyl group.

The resin as a flocculating agent can be selected from the group of starches; cellulosic materials such as carboxymethyl cellulose and hydroxymethyl cellulose; polyurethanes, polysaccharide; proteins such as gelatine and casein; water-soluble naturally occurring polymers such as tannin and lignin; and synthetic water-soluble polymers such as polymers comprising polyvinyl alcohol, polymers comprising polyethylene oxide, polymers formed from acrylic acid monomers, and polymers formed from maleic anhydride monomers. Other suitable resins are acrylic polymers as described in EP2362014 [0027-0030]. Preferably the resin is a cationic resin, more preferably a cationic charged polyurethane. The resin content is preferably not more than 20 wt. % relative to the total mass of the fluid acting as primer (100 mass %).

The fluid acting as a primer may also comprise colorants, more specifically white colorants to obtain vivid colored images when the primer is overprinted with the aqueous inkjet ink of the fluid set according to the invention on dark or colored substrates like card board, black colored textile, . . . or a transparent substrates. More specifically the fluid acting as a primer preferably comprises white pigments. Suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the fluid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

For applications demanding white colour with some degree of transparency, the pigment preference is "nano" titanium dioxide. "Nano" titanium dioxide particles typically have an average size ranging from about 10 to about 200 nm, preferably from about 20 to about 150 nm, and more preferably from about 35 to about 75 nm. A fluid comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TiO_2$.

The titanium dioxide pigment may also bear one or more metal oxide surface coatings. These coatings may be applied using techniques known by those skilled in the art. Examples of metal oxide coatings include silica, alumina, aluminasilica, boria and zirconia, among others. These coatings can provide improved properties including reducing the photoreactivity of the titanium dioxide. Metal oxide coatings of alumina, aluminasilica, boria and zirconia result in a positive charged surface of the $TiO_2$ pigments and hence are particularly useful in combination with the compound functionalized with at least two functional groups selected from the group consisting of a primary amine and a secondary amine, which has a positive charge at usual pH of a primer. No additional surface treatment of the pigment, is then required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan).

When the fluid acting as a primer is jetted via an inkjet head or valve jet head, other additives may be added such as the ones described in § A.1.4.

A.2.2.2. Additives for the Fluid Acting as an Aqueous Inkjet Ink

The fluid as part of the fluid set according to the invention may also function as an aqueous inkjet ink in the formation of an image, also called co-reactive inkjet ink due to its ability to react with the first aqueous inkjet ink of the set primer.

The fluid acting as an inkjet ink preferably comprise the colorants as described in § A.1.3. and additives as described in § A.1.4.

A.2.2.3 Additives for the Fluid Acting as an Overcoat

If the fluid as part of the fluid set according to the invention functions as an overcoat which is coated or printed on top of the jetted aqueous inkjet ink according to the invention, the fluid may further comprise a resin. Suitable resins can be acrylic based resins, a urethane-modified polyester resin or a polyethylene wax.

The polyurethane resin may be incorporated in the fluid formulation acting as an overcoat as a dispersion and may be selected from the group consisting of aliphatic polyurethane dispersions, aromatic polyurethane dispersions, cationic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, for example, or a combination of two or more of the above.

Some examples of suitable polyurethane dispersions are NEOREZ R-989, NEOREZ R-2005, and NEOREZ R-4000 (DSM NeoResins); BAYHYDROL UH 2606, BAYHYDROL UH XP 2719, BAYHYDROL UH XP 2648, and BAYHYDROL UA XP 2631 (Bayer Material Science); DAOTAN VTW 1262/35WA, DAOTAN VTW 1265/36WA, DAOTAN VTW 1267/36WA, DAOTAN VTW 6421/42WA, DAOTAN VTW 6462/36WA (Cytec Engineered Materials Inc., Anaheim Calif.); and SANCURE 2715, SANCURE 20041, SANCURE 2725 (Lubrizol Corporation), for example, or a combination of two or more of the above.

Acrylic based resins include polymers of acrylic monomers, polymers of methacrylic monomers, and copolymers of the aforementioned monomers with other monomers. These resins are present as a suspension of particles having an average diameter of about 30 nm to about 300 nm. The acrylic latex polymer is formed from acrylic monomers or methacrylic monomer residues. Examples of monomers of the acrylic latex polymer include, by way of illustration, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene butadiene, p-chloromethylstyrene, divinyl benzene, vinyl naphthalene and divinylnaphthalene.

Some examples of suitable acrylic latex polymer suspensions are, JONCRYL 537 and JONCRYL 538 (BASF Corporation, Port ArthurTX); CARBOSET GA-2111, CARBOSET CR-728, CARBOSET CR-785, CARBOSET CR-761, CARBOSET CR-763, CARBOSET CR-765, CARBOSET CR-715, and CARBOSET GA-4028 (Lubrizol Corporation); NEOCRYL A-1110, NEOCRYL A-1131, NEOCRYL A-2091, NEOCRYL A-1127, NEOCRYL XK-96, and NEOCRYL XK-14 (DSM); and BAYHYDROL AH XP 2754, BAYHYDROL AH XP 2741, BAYHYDROL A 2427, and BAYHYDROL A2651 (Bayer), for example, or a combination of two or more of the above.

The concentration of the resin in the fluid acting as an overcoat is at least 1 wt. % and preferably lower than 30 wt. %, more preferably lower than 20 wt. %.

The overcoat can be applied onto the jetted aqueous inkjet ink by a coating technique or printed using a printing technique such as: gravure printing, flexographic printing, offset printing or ink jet printing. In a particular preferred embodiment, the varnish is printed using ink jet printing.

B. Inkjet Printing Method

The fluid set according to the invention is suitable to be used in an inkjet image recording method. The inkjet recording method according to the invention comprises the steps of:

a) jetting the aqueous inkjet ink making part of the fluid set according to the invention, on a substrate, preferably a non-porous substrate, the ink comprising a colorant and the dispersion of particles containing an oligomer or polymer having at least 3 repeating units comprising a functional group according to general formula I, II or III, more preferably the ink comprising a dispersion of capsules composed of a polymeric shell surrounding a core, the core containing an oligomer or polymer having at least 3 repeating units comprising a functional group according to general formula I, II or III; and b) applying the fluid of the fluid set according to the invention on a substrate preferably a non-porous substrate (the fluid is then acting as a primer) or onto the jetted aqueous inkjet (the fluid is then acting as an overcoat) or the fluid is jetted together with the aqueous inkjet ink to form a colored image (the fluid is then acting as an aqueous inkjet ink, more particularly as a co-reactive inkjet ink).

c) drying the applied fluid set by applying heat such as to obtain a temperature of the jetted ink of at least 60° C., more preferably at least 80° C. If the obtained temperature is below 60° C., no or insufficient crosslinking reaction occurs between the particles containing an oligomer or polymer having at least 3 repeating units comprising a functional group according to general formula I, II or III and the compound functionalized with at least two functional groups being a primary amine or a secondary amine. Consequently, no improvement of solvent resistance or adhesion of the jetted and dried ink is occurring.

In a preferred inkjet recording method, the method comprises the steps of:

a) applying the fluid according to the invention as a primer onto a substrate, preferably a non-porous substrate. The fluid comprises a compound functionalized with at least two functional groups selected from the group consisting of a primary amine and a secondary amine, a primary amine being more preferred. The fluid can be coated by any suitable coating method or printed using a printing technique such as: gravure printing, flexographic printing, offset printing or ink jet printing. In a particular preferred embodiment, the fluid is printed using ink jet printing and the compound functionalized with at least two functional groups selected from the group consisting of a primary amine and a secondary amine is a resin particle. This last means of applying the fluid has the advantage that the amount of required fluid is substantially lower than with other application methods of priming the substrate. Optionally the fluid can be dried by applying heat to a dry or semi-dry condition.

b) jetting the aqueous inkjet ink of the fluid set according to the invention onto the applied fluid, the ink comprising the dispersion of particles containing an oligomer or polymer having at least 3 repeating units comprising a functional group according to general formula I, II or III, more preferably the ink comprising a dispersion of capsules composed of a polymeric shell surrounding a core, the core containing an oligomer or polymer having at least 3 repeating units comprising a functional group according to general formula I, II or III; and c) drying the jetted inkjet ink by applying heat such as to obtain a temperature of the jetted ink of at least 60° C., more preferably at least 80° C.

In another preferred inkjet recording method, the method comprises the steps of: a) forming an image by ink jetting the fluid set onto a substrate, preferably a non-porous substrate. The fluid of the fluid set comprises a compound functionalized with at least two functional groups selected from the group consisting of a primary amine and a secondary amine, a primary amine being more preferred and preferably a colorant. More preferably, the compound is a resin particle. The aqueous inkjet ink of the fluid set according to the invention comprises the dispersion of particles containing an oligomer or polymer having at least 3 repeating units comprising a functional group according to general formula I, II or III, more preferably the ink comprising a dispersion of capsules composed of a polymeric shell surrounding a core, the core containing an oligomer or polymer having at least 3 repeating units comprising a functional group according to general formula I, II or III. The jetting of the fluid set in forming the image, can be performed by jetting the fluid and the aqueous inkjet ink sequentially or simultaneously; and c) drying the jetted fluid set by applying heat such as to obtain a temperature of the jetted ink of at least 60° C., more preferably at least 80° C.

In another preferred inkjet recording method, the method comprises the steps of: a) jetting the aqueous inkjet ink of the fluid set according to the invention onto a substrate, preferably a non-porous substrate. The ink comprising the dispersion of particles containing an oligomer or polymer having at least 3 repeating units comprising a functional group according to general formula I, II or III, more preferably the ink comprising a dispersion of capsules composed of a polymeric shell surrounding a core, the core containing an oligomer or polymer having at least 3 repeating units comprising a functional group according to general formula I, II or III; Optionally the inkjet ink can be dried by applying heat to a dry or semi-dry condition; and b) applying the fluid according to the invention as an overcoat onto the jetted aqueous inkjet ink. The fluid comprises a compound functionalized with at least two functional groups selected from the group consisting of a primary amine and a secondary amine, a primary amine being more preferred. The fluid can be coated by any suitable coating method or printed using a printing technique such as: gravure printing, flexographic printing, offset printing or ink jet printing. In a particular preferred embodiment, the fluid is printed using ink jet printing and the compound functionalized with at least two functional groups selected from the group consisting of a primary amine and a secondary amine is a resin particle. c) drying the applied fluid set by applying heat such as to obtain a temperature of the jetted ink of at least 60° C., more preferably at least 80° C.

In another preferred inkjet recording method, two or three of the preferred methods described above can be combined.

The substrate in the inkjet recording method may be porous, such as e.g. textile, paper, leather and card board substrates, but is preferably a non-absorbing substrate such as polyethylene terephthalate, polyethylene, polypropylene, polycarbonate, polyvinyl chloride, polyesters like polyethylene terephthalate (PET), polyethylene naphthalate (PEN), polylactide (PLA) or polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

Examples of the heating process to dry the fluid set according to the invention, or at least dry the fluid or aqueous inkjet ink, include, but are not limited to, heat press, atmospheric steaming, high-pressure steaming, THERMOFIX. Any heat source can be used for the heating process; for example, an infrared ray source is employed.

The drying step can be performed at the ambient air, but the heating step to achieve a temperature of the applied fluid set or at least one of the fluid or aqueous inkjet ink of at least 60° C., more preferably 80° C., must be performed by using a heat source. Examples of suitable heat sources include equipment for forced-air heating, radiation heating such as IR-radiation, including NIR- and CIR radiation, conduction heating, high-frequency drying, and microwave drying.

A preferred ink jet head for the inkjet printing system to jet the inkjet ink and optionally the fluid acting as primer and/or overcoat is a piezoelectric ink jet head. Piezoelectric inkjet jetting is based on the movement of a piezoelectric ceramic transducer when a voltage is applied thereto. The application of a voltage changes the shape of the piezoelectric ceramic transducer in the print head creating a void, which is then filled with ink or liquid. When the voltage is again removed, the ceramic expands to its original shape, ejecting a drop of ink from the ink jet head. However, the jetting of the aqueous inkjet ink and optionally the fluid according to the present invention is not restricted to piezoelectric inkjet printing. Other inkjet print heads can be used and include various types, such as a continuous type, a thermal print head type, a MEM-jet type head and a valve jet type.

C. EXAMPLES

C.1. Materials

All compounds are supplied by TCI Europe unless otherwise specified.

Desmodur N75 BA is a trifunctional isocyanate supplied by Bayer AG.

Lakeland ACP70 is a zwitterionic surfactant supplied by Lakeland Laboratories LTD.

Alkanol XC is an anionic surfactant supplied by Dupont.

Arquad T-50 is a mixture of cationic surfactants supplied by Akzo Nobel NV.

Cab-o-Jet 465M is a magenta pigment dispersion supplied by Cabot

Cab-O-Jet 450C is a cyan pigment dispersion supplied by Cabot

Tego Wet 270 is an ether modified poly(dimethylsiloxane) supplied by Evonik Industries PAA H10C, a 20 w % solution in water of a poly (allylamine) with a molecular weight of 60000, manufactured by Nittobo TERTAMINRES is a tertiary amine based resin prepared as follows: 30 g dimethylamino-ethyl methacrylate was dissolved in 40 g toluene. 25 mg 2,2'-azobis[2-methylbutyronitrile] was added. The reaction mixture was purged with nitrogen and heated to 80° C. The reaction was allowed to continue for 2 hours. An additional 125 mg 2,2'-azobis[2-methylbutyronitrile] was added and the reaction was allowed to continue for 22 hours at 80° C. The reaction mixture was allowed to cool down to room temperature and the solvent was removed under reduced pressure.

CATSURF-1: a cationic surfactant having the following structure, as disclosed in WO2018077624:

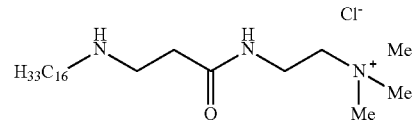

AMINE-1 is a primary amine functionalized colloid prepared as follows: A solution of 7 g octadecyl isocyanate in 40 g acetone was added over 3 minutes at room temperature to a mixture of 50 g of a 20 w % poly (allylamine) (Mw: 60000) in water and 200 g acetone. The mixture was stirred for 3 minutes using an Ultra Turrax at 15000 RPM. The mixture was refluxed for 20 minutes. The mixture was allowed to cool down to room temperature and stirred for 3 minutes using an Ultra Turrax at 15000 RPM. A solution of 2 g ethyl oxalate in 20 g acetone was mixed with a solution of CATSURF-1 in 4 g methanol. This mixture was stirred for 10 minutes at room temperature and added over 3 minutes to the polymer solution described above, followed by stirring with an Ultra Turrax at 15000 RPM. The mixture was stirred for 30 minutes at room temperature. 50 g water was added. The solvent and water was evaporated under reduced pressure to adjust the weight of the AMINE-1 dispersion to 80 g. 0.3 of Proxel K was added as biocide.

AMINE-2 is a primary amine functionalized colloid and was prepared as follows: A mixture of 5 g dimethyloctadecyl[3-(trimethoxysilyl)propyl] ammonium chloride and 30 g 3-aminopropyl-trimethoxysilane was added to 100 g water while stirring with an Ultra Turrax for 5 minutes at 18000 rpm. 50 ml water was added and the mixture was evaporated at 65° C. during two hours under reduced pressure to remove the methanol that is formed during the reaction. The mixture was further evaporated to obtain a 25 wt. % dispersion.

The average particle size was measured using a Zetasizer™ Nano-S (Malvern Instruments, Goffin Meyvis). A dual particle size distribution was obtained, with a main peak around 17 nm and a second maximum around 140 nm.

SUB-1: poly(propylene) (Priplak), supplied by Antalis
SUB-2: Synaps (SUV311) provide by Agfa-Gevaert NV
SUB-3: polycarbonate (Lexan PC 9030 Clear), supplied by Lexan
SUB-4: floated glass (Sn-contact side), supplied by Lerobel
SUB-5: Stainless steel 316 L, supplied by Dejond (Wilrijk, Belgium)
SUB-6: PVC (MD5-100), supplied by Metamark
SUB-7: roughened and anodized lithographic aluminium printing plate substrate C.2. Measurement Methods
C.2.1. Solvent Resistance and Water Resistance The solvent resistance is tested by wiping 40 times with a Q-tip over the coatings or printed images using isopropanol and methyl ethyl ketone as solvent or water.

A score of 0 means complete dissolution of the coating or image layer. A score of 1 means visible damage upon wiping. A score of 2 means no or hardly noticeable damage on the coating or image.

C.2.2. Adhesion

The adhesion of coatings and images onto the substrate was evaluated by a cross-cut test according to ISO2409: 1992(E). Paints (International standard 1992-08-15) using a Braive No. 1536 Cross Cut Tester from BRAIVE INSTRUMENTS with spacing of a 1 mm between cuts and using a weight of 600 g, in combination with a Tesatape™ 4104 PVC tape. The evaluation was made in accordance with a criterion as in Table 5, where both the adhesion in the cross-cut and outside the cross-cut were evaluated.

TABLE 5

| Evaluation value | Criterion |
| --- | --- |
| 0 | Nothing removed, perfect adhesion. |
| 1 | Detachment of only very small parts of the cured layer, almost perfect adhesion. |
| 2 | Minor parts of the cured layer was removed by the tape, good adhesion |
| 3 | Parts of the cured layer were removed by the tape, poor adhesion |
| 4 | Most of the cured layer was removed by the tape, poor adhesion |
| 5 | The cured layer was completely removed from the substrate by the tape, no adhesion |

C.2.2.3. Inkjet Recording Method

The inkjet recording equipment for performing the inkjet recording method was a Dimatix™ DMP2831 system, equipped with a standard Dimatix™ 10 pl print head. The ink was jetted at 22° C., using a firing frequency of 5 kHz, a firing voltage of 25 V and a standard waveform.

Example 1

This example illustrates the increase in chemical resistance due to the use of a fluid set containing an aqueous ink jet ink comprising a capsule design according to the present invention and a fluid, being an overcoat.

The Synthesis of Inventive Resin INVRES-1

10 g (46.6 mmol) 2-(acetoacetoxy)ethyl methacrylate was dissolved in 30 ml ethyl acetate. 0.472 g (2.33 mmol) dodecyl mercaptane was added and the mixture was purged with nitrogen. 134 mg (0.7 mmol) 2,2'-azobis[2-methylbutyronitrile] was added and the mixture was refluxed for 6 hours. The mixture was allowed to cool down to room temperature. The solution of inventive resin INVRES-1 in ethylacetate was directly used in the synthesis of inventive capsule INVCAP-1.

The molecular weight of INVRES-1 was determined, using GPC relative to poly(styrene) standards. INVRES-1 had a numeric weight average molecular weight Mn of 10500 and a weight average molecular weight Mw of 15400.

The Preparation of Inventive Capsule INVCAP-1:

13.2 g of Desmodur N75 BA was added to 37 g of the above described solution of INVRES-1 in ethyl acetate. 1.2 g of Lakeland ACP 70 was added and the solution was stirred for an hour at room temperature.

This solution was added to a solution of 3.36 g Lakeland ACP 70, 1.17 g lysine and 1.5 g triethanol amine in 44 g water, while stirring with an Ultra Turrax at a rotation speed 16000 rpm for 5 minutes. 52 g water was added and the solvent evaporated at 60° C. under reduced pressure, while gradually increasing the vacuum from 500 mbar to 120 mbar. The weight of the dispersion was adjusted to 88 g by evaporating water at 120 mbar. The dispersion was stirred for 16 hours at 65° C. The dispersion was allowed to cool down to room temperature and the dispersion was filtered over a 1.6 μm filter.

The average particle size was measured using a Zetasizer™ Nano-S (Malvern Instruments, Goffin Meyvis). The average particle size was 183 nm.

Preparation of Inventive Ink INVINK-1

The inventive ink INVINK-1 was prepared by mixing the components according to Table 6. All weight percentages are based on the total weight of the ink jet ink.

TABLE 6

| Mass (wt. %) | INVINK-1 |
| --- | --- |
| INVCAP-1 | 39 |
| Cab-O-Jet 465M | 22.5 |
| Dowanol DPM | 19 |
| Alkanol XC | 0.5 |
| Ethylene glycol | 19 |

Preparation of the Comparative Overcoats COMPOV-1 and COMPOV-2.

COMPOV-1 was prepared by diluting 100 g of a 20 wt. % solution of polyDADMAC with 6 g of a 25 wt. % solution of Arquad T-50 and stirred for one hour. The solution was diluted with water to obtain 150 g. A 13.3 wt. % solution of polyDADMAC was obtained. COMPOV-1 contains a non-reactive quaternary ammonium based resin.

COMPOV-2 was prepared by adding 70 g water was to 13.3 g of TERTAMINRES. The mixture was neutralized with a 37 wt. % solution of hydrochloric acid. 1 g cetyltrimethyl ammonium chloride was added followed by the addition of water to obtain 100 g of the solution. COMPOV-2 contains a non-reactive tertiary amine based resin.

Preparation of the Inventive Overcoats INVOV-1.

INVOV-1 was prepared by neutralizing 100 g of PAA H 10C, with a 37 wt. % solution of hydrochloric acid. A 20 g was needed to bring the pH to 7.6 g of a 25 wt. % solution of Arquad T-50 was added and the solution was stirred for one hour. The solution was diluted with water to obtain 150 g. A 13.3 w % solution of the neutralized poly(allylamine) was obtained.

The inventive ink INVINK-1 was coated on a Synaps OM230 (Agfa-Gevaert), using a 10 micron wired bar, and dried for 15 minutes at 80° C. On top of this coating the different overcoats were coated using a 10 micron wired bar, and dried for 15 minutes at 80°. The solvent resistance of the coatings was measured according to the method in § C.2.1. The results are summarized in Table 7.

TABLE 7

| Fluid set | Isopropanol resistance | MEK resistance |
|---|---|---|
| INVINK-1 + INVOV-1 | 2 | 1 |
| INVINK-1 + COMPOV-1 | 0 | 0 |
| INVINK-1 + COMPOV-2 | 0 | 0 |
| INVINK-1 | 0 | 0 |

From Table 7, it becomes apparent that only the coating obtained with the inventive fluid set (INVINK-1+INVOV-1) resulted in solvent resistant layers, while the other coatings did not show any solvent resistance at all.

Example 2

This example illustrates the increase in chemical resistance when jetting an aqueous ink jet ink according to the present invention on the fluid according to the invention and which was applied as a primer.
Preparation of Inventive Primer INVPRIM-1

INVPRIM-1 was a 20 wt. % solution of poly(allylamine) Mw 60000.

The INVPRIM-1 was coated on SUB-1, using a 10 micron wired bar, and dried for 5 minutes at 50° C.

Inventive ink INVINK-1 was jetted on the coated substrate described above and on an un-primed substrate as comparative sample, according to the method of § 0.2.3. The jetted layers were dried at 80° C. for 5 minutes.

The solvent resistance of each sample was tested according to § 0.2.1. The results are summarized in Table 8.

TABLE 8

| Fluid set | Isopropanol resistance | MEK resistance |
|---|---|---|
| INVPRIM-1 + INVINK-1 | 2 | 2 |
| INVINK-1 | 0 | 0 |

From Table 8, it becomes apparent that only the fluid set being a combination of a fluid (as primer) and an aqueous ink, both according to the present invention results in solvent resistant images.

Example 3

This example illustrates the increase in solvent resistance by using a fluid set, comprising an ink comprising a capsule according to the present invention, and a fluid acting as an ink comprising an amine functionalized resin according to the present invention.
Preparation of Inventive Inks INVINK-2 and INVINK-3

Inventive ink INVINK-2 was prepared by mixing the components according to Table 9. All weight percentages are based on the total weight of the ink jet ink. Inventive ink INVINK-3 was equal to AMINE-1.

TABLE 9

| Wt. % of | INVINK-2 |
|---|---|
| INVCAP-1 | 38 |
| Cab-O-Jet 465M | 22 |
| Surfinol 104H | 2 |
| Dowanol DPM | 19 |
| Ethylene glycol | 19 |

Preparation of Comparative Ink COMPINK-1

State of the art poly(urethane) based inks have been disclosed in WO2018077624. Based on WO2018077624, comparative ink COMPINK-1 has been formulated by mixing the components according to Table 10. All weight percentages are based on the total weight of the ink jet ink.

TABLE 10

| Mass (wt. %) | COMPINK-1 |
|---|---|
| PU-1 | 28.5 |
| Cab-O-Jet 450C | 20 |
| Tego Wet 270 | 0.6 |
| 2-pyrrolidone | 20 |
| 1,2-hexane diol | 20 |
| Water | 10.9 |

PU-1 has been prepared as disclosed in WO2018077624 as PU-9.

The inventive ink INVINK-2 and the comparative ink COMPINK-1 were coated on substrates SUB-1 to SUB-7, using a 4 micron wired bar, and dried for 15 minutes at 80° C.

The sample containing a coating of INVINK-2 was over coated with the INVINK-3, using a 4 micron wired bar, and dried for 15 minutes at 80° C.

The solvent resistance, water resistance and adhesion on the coated samples were measured according to § 0.2.1 and § 0.2.2. The results are summarized in Table 11.

TABLE 11

| Fluid set: | INVINK-2 + INVINK-3 | | | | COMPINK-1 | | | |
|---|---|---|---|---|---|---|---|---|
| | Adhesion | MEK | IPA | Water | Adhesion | MEK | IPA | water |
| Sub-1 | 0 | 2 | 2 | 2 | 5 | 0 | 0 | 0 |
| Sub-2 | 0 | 2 | 2 | 2 | 0 | 0 | 1 | 2 |
| Sub-3 | 0 | 2 | 2 | 2 | 0 | 0 | 1 | 2 |
| Sub-4 | 0 | 2 | 2 | 0 | 5 | 0 | 1 | 0 |
| Sub-5 | 0 | 1 | 1 | 1 | 0 | 0 | 1 | 2 |
| Sub-6 | 2 | 1 | 1 | 1 | 0 | 0 | 0 | 2 |
| Sub-7 | 0 | 1 | 1 | 0 | 5 | 0 | 1 | 0 |

From table 11, it becomes apparent that the coatings obtained by the inventive fluid set (INVINK-2+INVINK-3) give considerably more latitude in chemical resistance and water resistance on different substrates, while maintaining excellent adhesion performance, in comparison with a poly(urethane) based resin ink.

Example 5

This example illustrates the excellent adhesion performance and solvent resistance on polypropylene of an image obtained by jetting a fluid set comprising an ink comprising the capsules according to the present invention and a fluid acting as ink and comprising a primary amine functionalized colloid according to the present invention.

Preparation of INVINK-4

INVINK-4 was prepared by mixing the components according to Table 12. All weight percentages are based on the total weight of the ink jet ink.

TABLE 12

| Wt. % of | INVINK-4 |
|---|---|
| AMINE-1 | 59.5 |
| Glycol | 20 |
| 1,2-propane diol | 20 |
| Arquad T-50 | 0.5 |

Inventive ink INVINK-1 was printed on SUB-1 according to the method described in § 0.2.3. The ink layer was overprinted twice with INVINK-4. The jetted layers were dried at 80° C. for 5 minutes. The solvent resistance, water resistance and adhesion were measured according to the methods in § 0.2.1. and C.2.2. The results are summarized in Table 13.

TABLE 13

| Adhesion performance | 0 |
|---|---|
| MEK resistance | 2 |
| IPA resistance | 2 |
| Water resistance | 2 |

From Table 13, it becomes apparent that a fluid set, comprising an ink comprising a capsule according to the present invention and an ink comprising a primary amine functionalized dispersion gives excellent physical properties on non-absorbing substrates without the need for heat treatments at elevated temperatures.

Example 6

This example illustrates the use of the fluid set based on a fluid having sol-gel based primary amine functionalized colloids as jettable reactive resin and an inkjet ink comprising a capsule according to the present invention.

Preparation of Inventive Ink INVINK-5

INVINK-5 was prepared by mixing the components according to Table 14. All weight percentages are based on the total weight of the ink jet ink.

TABLE 14

| Wt. % of | INVINK-5 |
|---|---|
| AMINE-2 | 60 |
| Glycol | 20 |
| Dowanol DPM | 20 |

Inventive ink INVINK-2 was printed on a polyester/cotton fabric, without special coating from Premier Textiles, UK according to the method described in § 0.2.3. The ink layer was overprinted twice with INVINK-5, according to the method described in § C.2.3. A reference sample was printed only with inventive ink INVINK-2. The samples were dried at 80° C. for 15 minutes.

After printing and drying of the solid areas on the fabric, the dry and wet crock fastness test is done according to ISO105-X12 with a Crockmeter SDL ATLAS M238AA. The coloration of the white rubbing cloth was given as ΔE according to the Cielab color space. The lower the ΔE values, the better the crock fastness. The results are summarized in Table 15.

TABLE 15

| | Fluid set: INVINK-2 + INVINK-5 | INVINK-5 |
|---|---|---|
| Dry crock | 7.8 | 8.4 |
| Wet crock | 12.4 | 35.6 |

From Table 15, it becomes apparent that a fluid set, comprising an ink comprising a capsule according to the present invention and an ink comprising a primary amine functionalized dispersion gives clearly improved wet crock values.

The invention claimed is:

1. A fluid set comprising a fluid comprising a compound functionalized with at least two functional groups selected from the group consisting of a primary amine and a secondary amine, and an aqueous inkjet ink comprising a colorant and a polymeric particle comprising an oligomer or polymer having at least 3 repeating units comprising a functional group according to Formula I, II, or III:

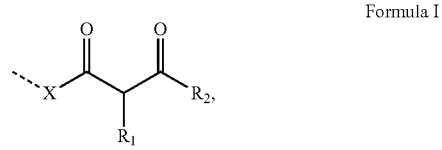

Formula I

Formula II

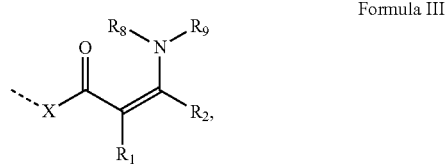

Formula III wherein $R_1$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $COR_3$, and CN, $R_2$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, and $COR_3$, or $R_1$ and $R_2$ may represent the necessary atoms to form a five to eight membered ring, $R_3$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, a substituted or unsubstituted aryl or heteroaryl group, $OR_4$, and $NR_5R_6$, $R_4$ is selected from the group consisting of a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, $R_5$ and $R_6$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_5$ and $R_6$ may represent the necessary atoms to form a five to eight membered ring, X is selected from the group consisting of O and $NR_7$, $R_7$ is selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, and $R_8$ and $R_9$ are each independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group, or $R_8$ and $R_9$ may represent the necessary atoms to form a five to eight membered ring.

2. The fluid set of claim 1, wherein the polymeric particle is a capsule, the capsule comprising a polymeric shell surrounding a core, the core comprising the oligomer or polymer having at least 3 repeating units comprising a functional group according to Formula I, II or III.

3. The fluid set of claim 2, wherein the polymeric shell comprises a poly(urea), a (poly)urethane, or a combination thereof.

4. The fluid set of claim 1, wherein the compound is a resin particle, functionalized with at least 5 functional groups selected from the group consisting of a primary amine and a secondary amine.

5. The fluid set of claim 2, wherein the compound is a resin particle, functionalized with at least 5 functional groups selected from the group consisting of a primary amine and a secondary amine.

6. The fluid set of claim 1, wherein the oligomer or polymer comprises at least 15 repeating units.

7. The fluid set of claim 2, wherein the oligomer or polymer comprises at least 15 repeating units.

8. The fluid set of claim 1, wherein the compound is di- or trifunctional.

9. The fluid set of claim 2, wherein a dispersing group is covalently bonded to the polymeric shell, the dispersing group is selected from the group consisting of a carboxylic acid or salt thereof, a sulfonic acid or salt thereof, a phosphoric acid ester or a salt thereof, and a phosphonic acid or salt thereof.

10. The fluid set of claim 1, wherein the colorant is a pigment.

11. The fluid set of claim 2, wherein the colorant is a pigment.

12. The fluid set of claim 1, wherein the fluid comprises a colorant.

13. The fluid set of claim 1, wherein the fluid comprises a component capable of aggregating components in the aqueous inkjet ink.

14. The fluid set of claim 2, wherein the fluid comprises a component capable of aggregating components in the aqueous inkjet ink.

15. The fluid set of claim 1, wherein the fluid comprises a resin selected from the group consisting of polyacrylates and polyurethanes.

16. The fluid set of claim 2, wherein the fluid comprises a resin selected from the group consisting of polyacrylates and polyurethanes.

17. An inkjet recording method using the fluid set of claim 1, the method comprising the steps of:
a) jetting the aqueous inkjet ink as defined in the claim 1 onto a substrate; and
b) applying the fluid as defined in the claim 1 before, after or during the jetting of the inkjet ink; and
c) drying the applied fluid set by applying heat such as to obtain a temperature of the jetted ink of at least 60° C.

18. An inkjet recording method using the fluid set of claim 2, the method comprising the steps of:
a) jetting the aqueous inkjet ink as defined in the claim 2 onto a substrate; and
b) applying the fluid as defined in the claim 2 before, after or during the jetting of the inkjet ink; and
c) drying the applied fluid set by applying heat such as to obtain a temperature of the jetted ink of at least 60° C.

19. The inkjet recording method of claim 17, wherein the fluid is applied via a technique selected from the group of ink jetting, valve jetting and spraying.

20. The inkjet recording method of claim 18, wherein the fluid is applied via a technique selected from the group of ink jetting, valve jetting and spraying.

* * * * *